United States Patent [19]
Dimroth et al.

[11] 3,926,987
[45] Dec. 16, 1975

[54] DIOXAZINE DYES
[75] Inventors: Peter Dimroth, Ludwigshafen; Volker Radtke, Frankenthal, both of Germany
[73] Assignee: Badische Anilin- & Soda-Fabrik Aktiengesellschaft, Ludwigshafen (Rhine), Germany
[22] Filed: Aug. 1, 1974
[21] Appl. No.: 493,780

[30] Foreign Application Priority Data
Aug. 24, 1973 Germany............................ 2342815

[52] U.S. Cl............................................. 260/246 R
[51] Int. Cl.².............C07D 265/00; C07D 273/00; C07D 295/00
[58] Field of Search ..................... 260/246 R, 246 B

[56] References Cited
UNITED STATES PATENTS
3,575,971    4/1971    Harris et al. ..................... 260/246 R Primary Examiner—Albert T. Meyers
Assistant Examiner—D. W. Robinson

[57] ABSTRACT
A dioxazine dye of the formula:

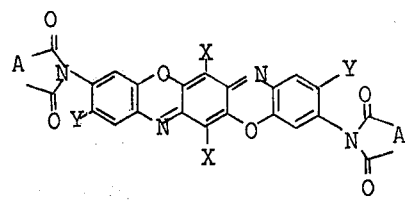

in which
A is o-phenylene, o-naphthylene or peri-naphthylene which may bear substituents which do not impart solubility in water;
X is chloro or bromo; and
Y is halogen, phenoxy alkyl or alkoxy of one to four carbon atoms.

These dioxazine dyes are pigments and give violet colorations for example in surface coatings or plastics; they have excellent fastness to light, weathering and solvents. The dyes are also stable to high temperature.

5 Claims, No Drawings

DIOXAZINE DYES

The invention relates to new dioxazine dyes of the formula (I):

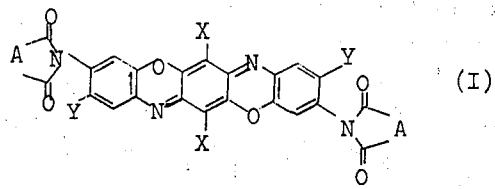

in which

A is o-phenylene, o-naphthylene or peri-naphthylene which may bear substituents which do not impart solubility in water;

X is a chloro or bromo; and

Y is halogen, phenoxy, alkyl or alkoxy of one to four carbon atoms.

The new dyes are pigments and give violet colorations having excellent fastness properties, particularly excellent fastness to light, weathering and solvents and at the same time having excellent color strength. The new dyes are eminently suitable for coloring surface coatings and especially for coloring plastics.

Examples of groups which do not impart solubility in water include the following substituents: halogen atoms such as chlorine, bromine or fluorine; alkoxy of one to four carbon atoms; aryloxy; arylthio; alkyl of one to four carbon atoms; trifluoromethyl; N-monosubstituted or N,N-disubstituted carbamoyl or sulfamoyl groups. Preferred groups not imparting solubility in water on A include, in addition to hydrogen, especially chloro, bromo, N-monosubstituted and N,N-disubstituted carbamoyl groups. Alkoxy of one to four carbon atoms and especially methoxy or ethoxy are preferred for Y.

Dyes of the formula (I) may be prepared by reacting a compound of the formula (II):

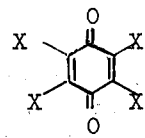

with a compound of the formula (III):

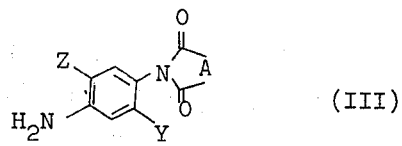

in which

Z is alkoxy of one to four carbon atoms or phenoxy and preferably methoxy or ethoxy. The reaction is conveniently carried out in an inert high boiling point solvent, for example in nitrobenzene, dichlorobenzene or trichlorobenzene, at temperatures of from 100° to 180°C.

The 2,5-bisarylamino-3,6-dihalo-1,4-benzoquinones thus obtained and having the formula (IV):

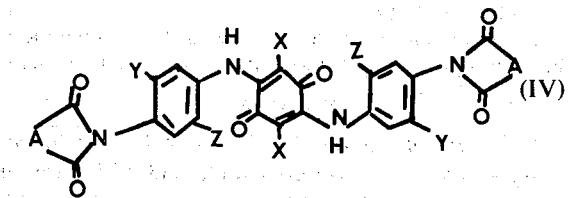

may be cyclized into compounds of formula (I) either after isolation or direct in a one-vessel process by heating at a temperature of from 180° to 250°C, for example in an inert solvent and if necessary in the presence of an agent which accelerates or facilitates the condensation.

Cyclization may be carried out for example by heating compound (IV) in a high boiling point solvent such as nitrobenzene or trichlorobenzene at from 200° to 210°C. To facilitate cyclization the condensation is preferably carried out in an inert solvent in the presence of an agent which facilitates cyclization. Examples of such agents are benzoyl chloride or another condensation auxiliary having an acid reaction.

Reaction of (II) with (III) and cyclization of (IV) may also be carried out in one stage in one vessel.

Compounds of formula (III) required as starting materials may be obtained from compounds of formula (V):

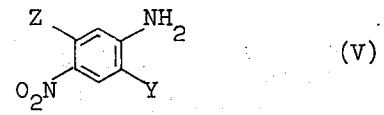

by reaction with compounds of formula (VI):

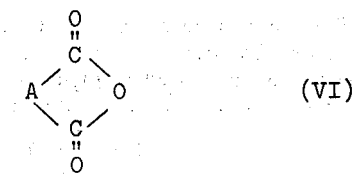

followed by reduction of the nitro group to an amino group. A, Z and Y in formulae (V) and (VI) have the above meanings.

The reactions are known in principle and proceed analogously under comparable conditions. Details of the production may be seen from the Examples.

Compounds of formula (Ia):

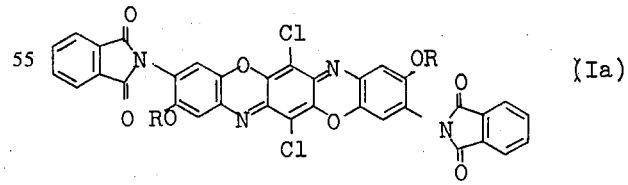

in which R is alkyl of one to four carbon atoms and preferably methyl or ethyl are of special industrial significance.

The hues of the dyes of formula (I) are in the violet range. Colorations exhibit excellent fastness properties and particularly excellent light fastness, weathering fastness and resistance to solvents.

Because of their high resistance to weathering the new dyes are especially suitable for use in coatings and for coloring plastics.

The following Examples will illustrate the invention. Parts and percentages hereinafter given are by weight.

EXAMPLE 1

21.5 parts of chloranil, 60 parts of N-(2',5'-dimethoxy-4'-aminophenyl)-phthalimide and 17.5 parts of sodium acetate are heated for six hours at 150°C in 500 parts of anhydrous nitrobenzene. The whole is allowed to cool, suction filtered, washed with nitrobenzene, methanol and water and dried. 63 parts of a brown powder of the formula:

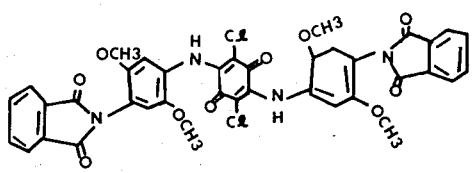

is obtained.

63 parts of this benzoquinone derivative is heated in 250 parts of dry nitrobenzene with 30 parts of benzoyl chloride for 10 hours at 200° to 210°C. The whole is suction filtered at 100°C, washed with nitrobenzene, methanol and water and dried. 49 parts of a deeply colored violet pigment is obtained of the formula:

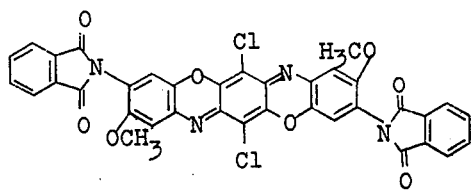

The color strength can be further considerably increased by grinding the crude product by methods conventionally used in pigment chemistry or by dissolving it in and reprecipitating it from sulfuric acid.

EXAMPLE 2

The 60 parts of N-(2',5'-dimethoxy-4'-aminophenyl)-phthalimide in Example 1 is replaced by the equivalent amount of N-(2',5'-diethoxy-4'-aminophenyl)-phthalimide and in other respects the procedure described in Example 1 is repeated. A violet pigment of the formula:

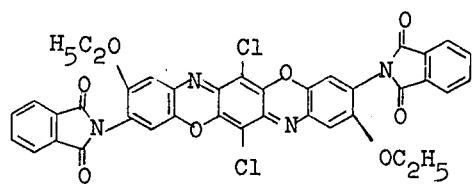

is obtained which has comparable properties.

EXAMPLE 3

12.3 parts of chloranil, 9 parts of anhydrous sodium acetate and 36 parts of 4-chloro-N-(2',5'-dimethoxy-4'-aminophenyl)-phthalimide are heated for five hours at 130° to 140°C in 250 parts of dry o-dichlorobenzene. The whole is allowed to cool, suction filtered, washed with o-dichlorobenzene, methanol and water and dried.

20 parts of the bisarylaminobenzoquinone thus obtained is heated in 200 parts of dry nitrobenzene for five hours at 200° to 210°C. The product is suction filtered, washed with nitrobenzene, ethanol and water and dried. A violet pigment is obtained in the form of powder. It has the formula:

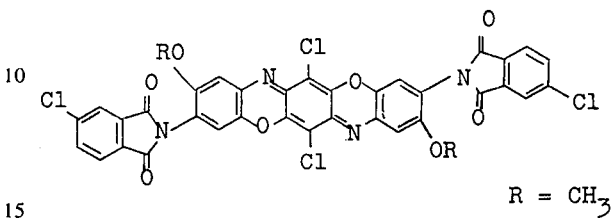

R = CH₃

EXAMPLE 4

The 36 parts of 4-chloro-N-(2',5'-dimethoxy-4'-aminophenyl)-phthalimide in Example 3 is replaced by the equivalent amount of 4-chloro-N-(2',5'-diethoxy-4-aminophenyl)-phthalimide and otherwise the procedure described in Example 3 is repeated. A violet pigment having the formula given in Example 3 (with R equal to $C_2H_5$) is obtained.

EXAMPLE 5

24.6 parts of chloranil, 17.5 parts of anhydrous sodium acetate and 85 parts of 4-phenylaminocarbonyl-N-(2',5'-dimethoxy-4'-aminophenyl)-phthalimide are heated for seven hours at 130° to 135°C in 1,000 parts of dry o-dichlorobenzene. After cooling the whole is suction filtered, washed with o-dichlorobenzene, ethanol and water and dried.

25 parts of the reaction product of the formula:

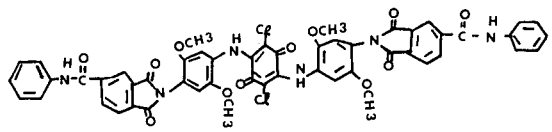

thus obtained is heated in 250 parts of anhydrous nitrobenzene with 10 parts of benzoyl chloride for 6 hours at 200° to 210°C. The whole is suction filtered at 100°C, washed with nitrobenzene, methanol and water and dried. A violet powder of the formula:

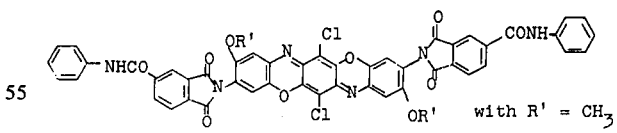

with R' = CH₃ is obtained.

EXAMPLE 6

The procedure of Example 5 is repeated except that the 4-phenylaminocarbonyl-N-(2',5'-dimethoxy-4'-aminophenyl)-phthalimide is replaced by an equivalent amount of 4-phenylaminocarbonyl-N-(2',5'-diethoxy-4-aminophenyl)-phthalimide. Again a fast violet pigment is obtained; it has the formula given in Example 5 with R' = $C_2H_5$.

EXAMPLE 7

12.3 parts of chloranil, 43.6 parts of 3,4,5,6-tetrachloro-N-(2',5'-dimethoxy-4'-aminophenyl)-phthalimide and 10 parts of anhydrous sodium acetate are heated for five hours at 120° to 125°C in 180 parts of nitrobenzene. Without intermediate isolation 70 parts of benzoyl chloride is added and the whole is heated to 200°C and kept at this temperature for 4 hours. The product is suction filtered, washed with nitrobenzene, methanol and water and dried. By dissolving the product in sulfuric acid and reprecipitating it a deeply colored violet pigment which is fast to light is obtained; it has the formula:

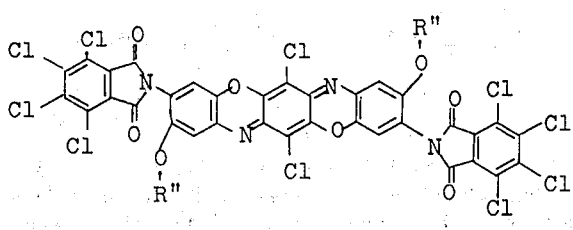

EXAMPLE 8

The procedure described in Example 7 is repeated but 46.4 parts of 3,4,5,6-tetrachloro-N-(2',5'-diethoxy-4'-aminophenyl)-phthalimide is used instead of 43.6 parts of 3,4,5,6-tetrachloro-N-(2',5'-dimethoxy-4'-aminophenyl)-phthalimide. A pigment of the formula given in Example 7 with $R'' = C_2H_5$ is obtained; it has similar properties.

EXAMPLE 9

42 parts of N-(2',5'-dimethoxy-4'-aminophenyl)-1,8-naphthalimide, 15 parts of chloranil and 9 parts of sodium acetate are stirred for 5 hours at 120° to 130°C in 400 parts of nitrobenzene. After cooling the product is suction filtered, washed with nitrobenzene, methanol and water and dried.

25 parts of the reaction product thus obtained is stirred in 60 parts of nitrobenzene and 12 parts of benzoyl chloride for 4 hours at 195° to 200°C. The product is suction filtered while hot, washed with nitrobenzene, ethanol and water and dried. After the product has been dissolved in sulfuric acid and reprecipitated a bright, deeply colored violet pigment is obtained which has the formula:

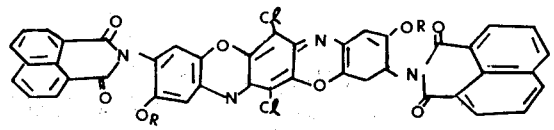

EXAMPLE 10

The 42 parts of N-(2',5'-dimethoxy-4'-aminophenyl)-1,8-naphthalimide is replaced by the equivalent amount of N-(2',5'-diethoxy-4'-aminophenyl)-1,8-phthalimide but otherwise the procedure described in Example 9 is repeated. A pigment having good fastness properties is again obtained. The pigment has the formula given in Example 9 with $R = C_2H_5$.

EXAMPLE 11

The procedure of Example 7 is repeated but using 67.4 parts of 3,4,5,6-tetrabrom-N-(2',5'-dimethoxy-4'-aminophenyl)-phthalimide instead of the tetrachloro compound. A fast violet pigment is obtained having the formula:

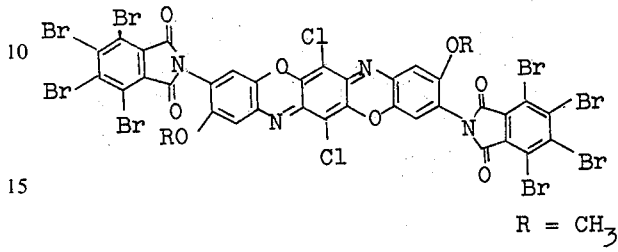

$R = CH_3$

EXAMPLE 12

The procedure described in Example 7 is repeated but 70.2 parts of 3,4,5,6-tetrabromo-N-(2',5'-diethoxy-4'-aminophenyl)-phthalimide is used instead of the tetrachloro compound. A violet pigment having good fastness properties is obtained. The pigment has the formula given in Example 11 with $R = C_2H_5$.

EXAMPLE 13

20 parts of the benzoquinone of the formula:

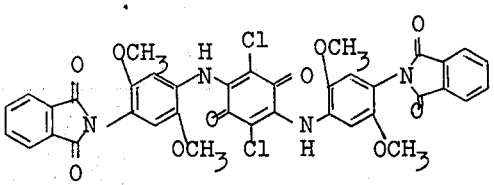

(prepared as described in Example 1) is introduced at 0° to 10°C into 150 parts of 96% sulfuric acid. The whole is stirred for another 2 hours at from 0° to 10°C and then precipitated on ice, suction filtered, washed with water until neutral and dried. 17 parts of a deeply colored pigment of the formula:

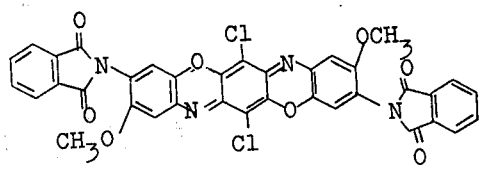

is obtained.

EXAMPLE 14

48 parts of chloranil, 128 parts of N-(2',5'-diethoxy-4'-aminophenyl)-phthalimide and 40 parts of anhydrous sodium acetate are heated for ten hours at 140°C in 1000 parts of o-dichlorobenzene. The product is cooled, suction filtered, washed with o-dichlorobenzene, methanol and water and dried. The yield is 91 parts of a brown powder of the probable formula:

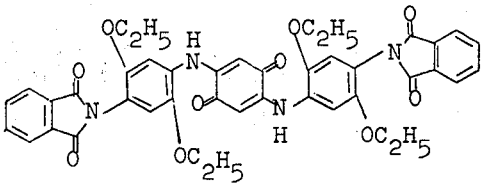

20 parts of this compound is introduced at 0° to 10°C into 160 parts of 96% sulfuric acid. The whole is kept for 2 hours at 0° to 5°C, precipitated on ice, suction filtered, washed until neutral and dried. 17 parts of a brilliant deeply colored violet pigment is obtained having the formula:

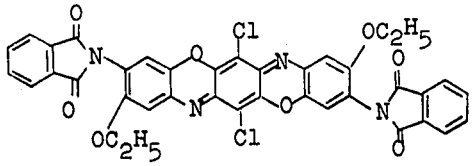

EXAMPLE 15

12.3 parts of chloranil, 37 parts of N-(2',5'-dimethoxy-4'-aminophenyl)-3,6-dichlorophthalimide and 10 parts of anhydrous sodium acetate are heated in 200 parts of dry nitrobenzene for 6 hours at 130°C. After the product has cooled it is suction filtered, washed with nitrobenzene, methanol and water and dried. A brown powder of the formula:

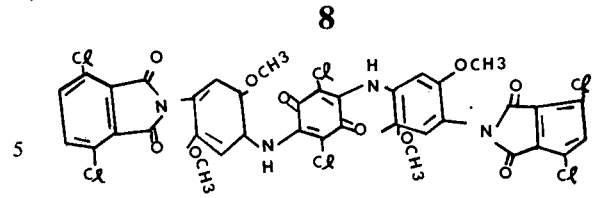

is obtained.

20 parts of this compound is heated for 4 hours at 200°C in 200 parts of nitrobenzene with 25 parts of benzoyl chloride. The product is suction filtered while hot, washed with nitrobenzene, methanol and water and dried. A fast violet pigment is obtained having the formula:

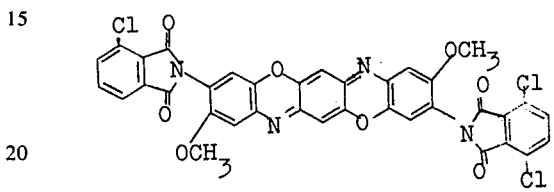

The N-(2',5'-dimethoxy-4'-aminophenyl)-3,6-dichlorophthalimide is replaced by an equivalent amount of the amines given in column (b) and otherwise the procedure of Example 15 is repeated. The dyes given in column (c) are obtained which are also valuable pigments:

| (a) Example | (b) Amine | (c) Dye |
|---|---|---|

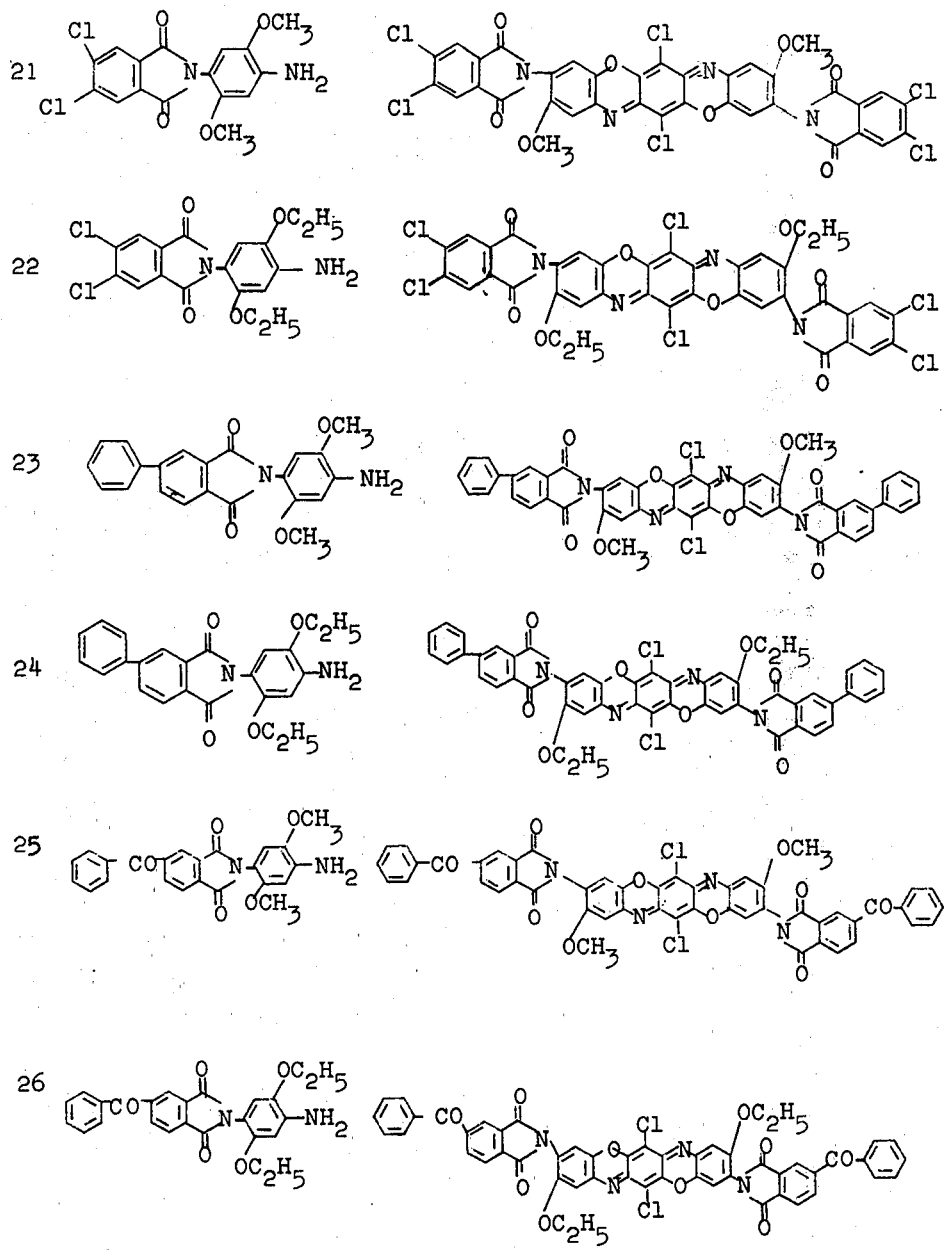

We claim:
1. A dioxazine dye of the formula

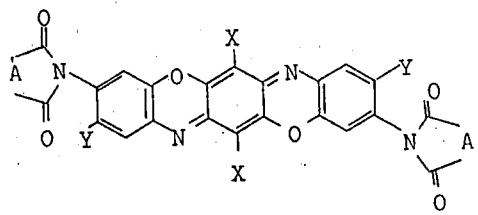

in which A is o-phenylene, o-phenylene substituted 1 to 4 times by chloro or bromo, or o-phenylene substituted once by phenyl, benzoyl or N-phenylcarbamoyl,
Y is methoxy or ethoxy and
X is chloro or bromo.

2. A dioxazine dye of the formula given in claim 1 in which A is o-phenylene, o-naphthylene or peri-naphthylene in which one to four hydrogen atoms are replaced by chloro or bromo or one hydrogen is replaced by N-phenylcarbamoyl, X is chloro and Y is alkoxy of one to four carbon atoms.

3. A dye of the formula given in claim 1 in which A is o-phenylene which may bear chloro or bromo as a substituent, X is chloro and Y is methoxy or ethoxy.

4. A dye of the formula given in claim 1 in which A is unsubstituted o-phenylene, Y is alkoxy of one to four carbon atoms and X is chloro.

5. A dye as claimed in claim 4 in which Y is methoxy or ethoxy.

* * * * *

UNITED STATES PATENT AND TRADEMARK OFFICE
CERTIFICATE OF CORRECTION

PATENT NO. : 3,926,987
DATED : December 16, 1975
INVENTOR(S) : Peter Dimroth et al It is certified that error appears in the above-identified patent and that said Letters Patent are hereby corrected as shown below:

In Column 3, formula for Example 1, delete " 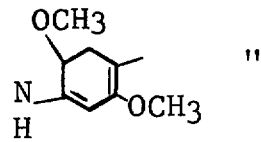 "

and substitute -- 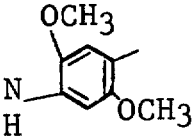 --

In Column 4, formula for Example 5, delete " 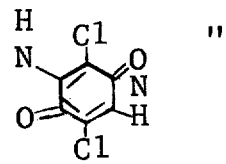 "

and substitute -- 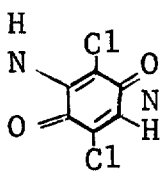 --

In Column 5, after the structural formula for Example 7, insert -- R" = $CH_3$. --

In Column 8, formula for Example 15, delete " 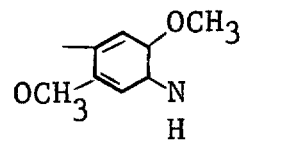 "

and substitute -- 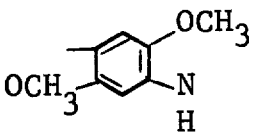 --

𝔖igned and 𝔖ealed this

Twelfth 𝔇ay of October 1976

[SEAL]

Attest:

RUTH C. MASON
*Attesting Officer*

C. MARSHALL DANN
*Commissioner of Patents and Trademarks*